(12) United States Patent
Fangmeier et al.

(10) Patent No.: US 7,143,784 B2
(45) Date of Patent: Dec. 5, 2006

(54) SANITARY FITTING

(75) Inventors: Martin Fangmeier, Auggen (DE);
Christoph Weis, Müllheim (DE)

(73) Assignee: Neoperl GmbH, Mullheim (DE)

( * ) Notice: Subject to any disclaimer, the term of this patent is extended or adjusted under 35 U.S.C. 154(b) by 170 days.

(21) Appl. No.: 10/520,746

(22) PCT Filed: Dec. 9, 2003

(86) PCT No.: PCT/EP03/13910

§ 371 (c)(1),
(2), (4) Date: Jan. 7, 2005

(87) PCT Pub. No.: WO2004/053243

PCT Pub. Date: Jun. 24, 2004

(65) Prior Publication Data

US 2006/0060248 A1   Mar. 23, 2006

(30) Foreign Application Priority Data

Dec. 10, 2002   (DE) .............................. 102 57 518

(51) Int. Cl.
| F16K 47/02 | (2006.01) |
| F16K 15/06 | (2006.01) |
| E03C 1/10 | (2006.01) |
| E03F 7/04 | (2006.01) |

(52) U.S. Cl. ........................................ 137/542; 138/30
(58) Field of Classification Search ............... 137/540, 137/541, 542, 543, 543.13, 543.15, 543.17, 137/543.19, 543.21, 543.23; 138/30
See application file for complete search history.

(56) References Cited

U.S. PATENT DOCUMENTS 3,679,326 A * 7/1972 Weber .......................... 417/38
4,742,889 A   5/1988 Rodriguez
5,494,069 A   2/1996 Bergmann

FOREIGN PATENT DOCUMENTS

| DE | 2 064 002 | 7/1972 |
| DE | 25 21 837 | 11/1976 |
| DE | 26 57 504 | 6/1978 |
| DE | 29 02 409 | 7/1980 |
| DE | 33 00 500 | 7/1984 |
| DE | 36 44 272.0 | 8/1987 |
| DE | 195 27 985 | 2/1997 |
| DE | 198 34 902.5 | 2/1999 |
| DE | 101 10 525 | 9/2002 |
| WO | WO 02/079678 | 10/2002 |

* cited by examiner

Primary Examiner—Ramesh Krishnamurthy
(74) Attorney, Agent, or Firm—Volpe and Koenig, P.C.

(57) ABSTRACT

A sanitary fitting (1) formed from a multi-wall housing (2) which can be inserted into a sanitary water pipe is provided that has at least two adjacent walls (6,7) surrounding an inner region (8). The fitting includes a checj valve , and one wall of the housing (2) is a tubular wall (7) formed of a flexible and/or elastic material. In order to relieve pressure when the check valve is closed and the fluid volume is sealed in on the outflow side, the housing wall (7) can be moved towards the adjacent housing wall (6), compressing the at least one inner region (8), or can be spaced apart from the adjacent housing wall (6) or moved away from same, enlarging the at least one inner region (8).

10 Claims, 2 Drawing Sheets

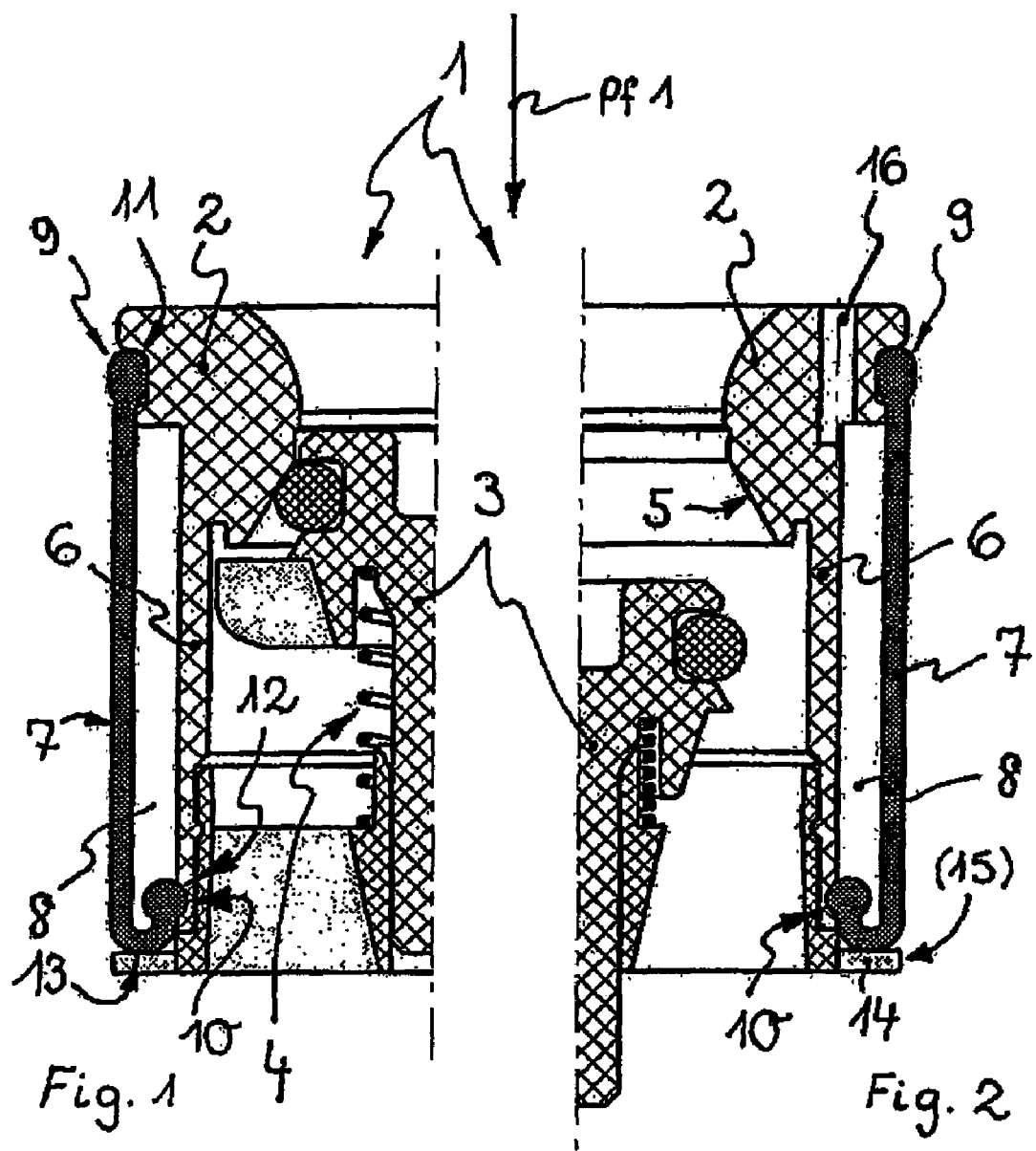

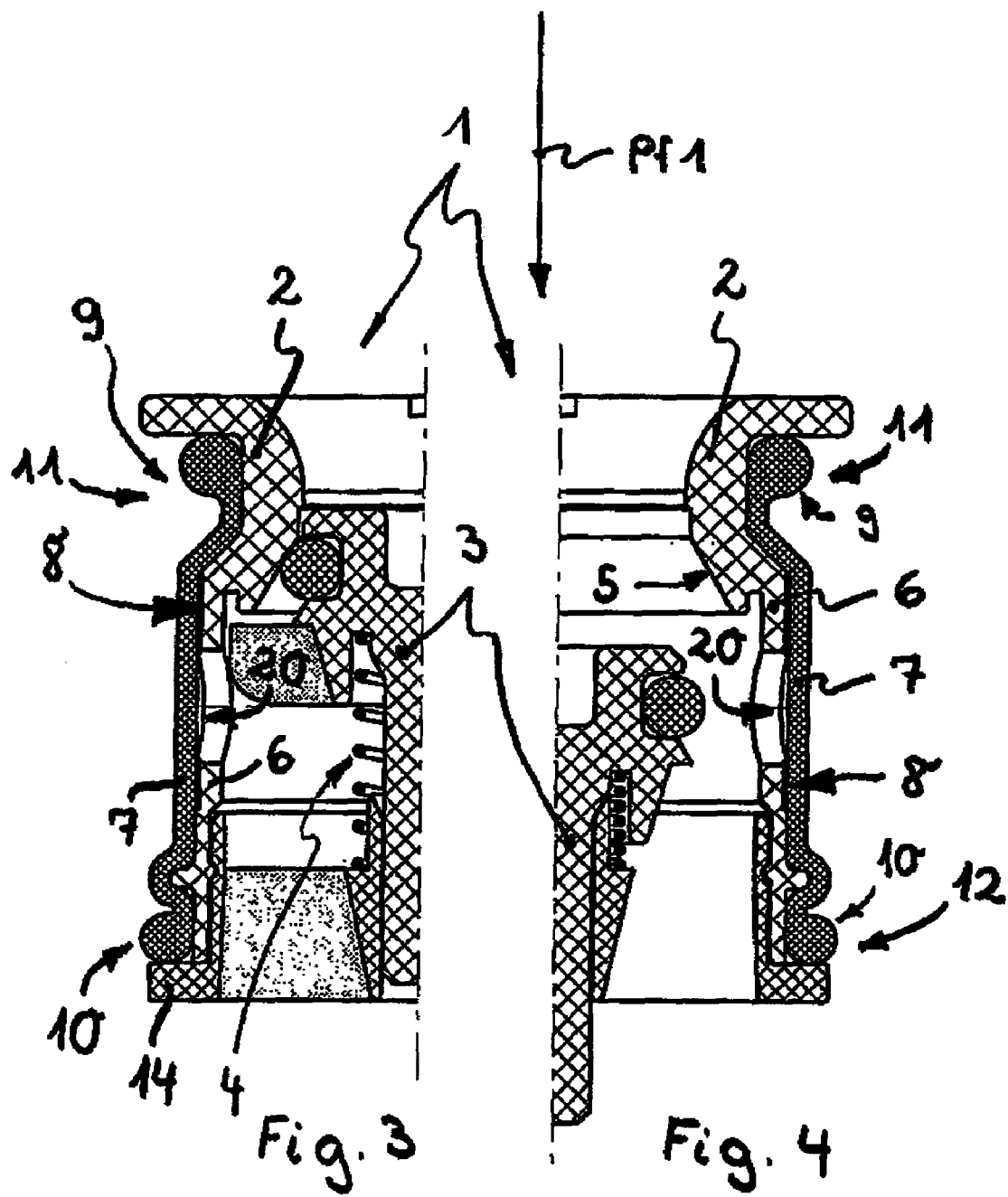

SANITARY FITTING

BACKGROUND

The invention relates to a sanitary fitting with a multi-wall housing, which can be set in a sanitary water pipe and has at least two mutually adjacent housing walls which enclose an inner region between them.

From DE 36 44 272 A1, a sanitary fitting of the above-mentioned kind is already known, which is provided as a noise damping device for sanitary installation pipes. The previously known fitting acting as a noise damping device is intended to oppose pressure vibrations and/or acoustic vibrations which are produced by the water flowing through. The previously known noise damping device has for this purpose a cylindrical bushing, of double-walled construction from an elastic material and with its bushing opening, oriented in the cylinder longitudinal direction, acting for the throughflow of the liquid. The two housing walls of the bushing delimit between them an annular inner region which is sealed by an annular sealing element. The previously known noise damping device can be pushed into a front end receiving hollow of a pipe section, widened in its cross section, until the sealing element, also used for positioning and mounting the bushing in the pipe, limits further pushing-in of the bushing. The previously known fitting is cheap to produce and easy to mount; however, its function is limited to that of a noise damping device.

Comparable noise damping devices are also previously known from DE 33 00 500 A1, DE 26 57 504 A1, DE 25 21 837 A1 and DE 20 64 002 A.

Fittings have also already been provided which act as check valves, stream controllers, or flow quantity controllers. Also, with a fitting designed for example as a check valve, undesired noise formation can result, which then becomes annoyingly evident in the whole building through the water pipe. With a fitting designed as a check valve, the problem additionally exists that such an overpressure may possibly build up on the downflow side in the closed position, that it can even have damaging effects on this check valve.

From DE 198 34 902A1, a ball-check valve with a housing is known. The housing of the known ball-check valve is formed with a double wall, whereby the inner housing wall is made of a flexible and/or elastic material formed membrane. The housing walls define a housing inner space, used for pressure shock damping that can be filled with a gas or a gaseous fluid through a valve. The membrane housing wall of the known ball-check valve divides the housing into two regions, namely a fluid through flow space and a pressure shock damping space. A pressure shock can through the membrane be transmitted to the pressure shock damping space and be damped by the medium in this space.

SUMMARY

The object therefore particularly exists to provide a sanitary fitting of the above-mentioned type, which is distinguished by its many-sided and functionally reliable mode of operation.

The objective is met according to the invention with a sanitary fitting of the known type further including the characteristics of the present claim 1.

The fitting according to the invention is designed as a check valve which has a multi-wall housing. This housing has at lest two mutually adjacent housing walls which enclose between them an inner region. This inner region is enclosed between an inner wall of comparatively stable shape and a housing outer wall formed, in contrast to this, of flexible and/or elastic material. The flexible and/or elastic housing outer wall is movable, or is movable away, or is brought to a spacing from the adjacent housing wall with expansion of the at least one inner region, for pressure equalization when the check valve is closed and a fluid volume is closed off on the downstream side with compression of the at least one inner region against the adjacent housing wall.

In the fitting according to the invention, the radial outer housing wall is formed of a flexible and/or elastic material, so that the fitting according to the invention can be sealingly installed in a fluid-tight manner in a sanitary water pipe.

The use of such a check valve in the context of thermostat mixers frequently gives rise to the problem that, when the cold water side or hot water side is shut off, the water which is enclosed between the closed check valve on the one hand and the likewise closed valve seat on the other hand is strongly heated by other actions, until system pressures arise which lead to damage to the weakest portion of the supply pipe and thus frequently to the check valve. This can lastly have the consequence of a closure of the supply pipe or a likewise undesired crossflow. With the fitting according to the invention, designed as a check valve, the housing outer wall is now movable for pressure equalization, with a closed check valve and a fluid volume shut off on the downstream side, either against the adjacent wall such that the inner region available as a pressure equalization volume is compressed, or can be brought to a spacing from the adjacent housing wall, with expansion of the at least one inner region, such that the inner region can take up within it at least a portion of the fluid volume shut off on the downstream side. The pressure equalization volume of this inner region is variable by means of the dimensions of the inner region or respectively of the check valve. The fitting according to the invention can repeatedly effect a pressure equalization without fear of damage to the housing outer wall and the corresponding loss of function. The fitting according to the invention, designed as a check valve, is thus not only effectively secured against an excess pressure,—rather, its inner region can—particularly because this is compressible by the fluid volume shut off on the downstream side—simultaneously act for noise and sound insulation. The inner region enclosed between the mutually adjacent housing walls may functionally reliably and effectively counter noise transmission and reduce water hammer.

It is particularly advantageous if the at least one inner region can be filled with air or the like sound-insulating medium.

It is appropriate if the elastic housing outer wall has an annular or sealing bead at least at its front end on the inflow side. This annular or sealing bead can act as a fastening means like a rubber ring, and/or as a sealing ring.

According to a further development of the invention, at least one annular bead seals the housing wall in a water-tight manner between the housing and the water pipe.

In addition or instead of this, it can be advantageous if at least one annular bead of the housing outer wall is held like a rubber ring in a groove of the adjacent housing wall. The annular bead can also hold a tubular housing outer wall securely and fixed to the adjacent housing wall.

A preferred embodiment according to the invention provides that the downstream end region of the tubular housing outer wall abuts on at least one housing shoulder of the housing.

In order to make available for pressure equalization the complete volume of the at least one inner region, it is advantageous if the at least one inner region is connected via at least one equalizing channel to the inflow side of the fitting.

So that a possible overpressure arising in the closed check valve can move and press the housing outer wall against the adjacent housing wall quickly and without time delays, it is advantageous if the fitting has at least one pressure equalizing or inflow channel connected to the outflow side of the fitting, and opening between the housing outer wall and the water pipe.

A preferred and particularly durable embodiment according to the invention provides that the tubular housing wall is produced from an elastomer, in particular of silicone.

Further features of the invention will become apparent from the following description of exemplary embodiments according to the invention in connection with the claims and the accompanying drawing. The individual features can be realized individually or collectively in an embodiment according to the invention.

BRIEF DESCRIPTION OF THE DRAWINGS

FIG. 1 is a half-sectional view of a check valve, shown with the valve body in the closed position, FIG. 2 is a half-sectional view of a check valve, shown with the valve body in the open position, comparable to FIG. 1, FIG. 3 is a half-sectional view of a check valve, shown with the valve body in the closed position, the check valve shown in FIG. 3 having a housing outer wall which can be expanded by a fluid volume shut off on the outflow side, FIG. 4 is a view comparable with FIG. 3, showing a check valve, likewise in a half-sectional view, with the valve body in the open position.

DETAILED DESCRIPTION OF THE PREFERRED EMBODIMENTS

In FIGS. 1–4, a sanitary fitting is shown in different embodiments. The fitting 1 has a housing 2 which can be inserted in a sanitary water pipe and has a housing diameter adapted to a size of the open receiving cross section of the water pipe.

It is clear from FIGS. 1–4 that the sanitary fitting 1 is embodied here as a check valve. The check valve 1 has a valve body 3 which is displaceably guided in the housing 2. The valve body 3 is moved by the pressure of the fluid flowing in the throughflow direction Pf1, and against the force of a return spring 4, from the closed position shown in FIG. 1 or FIG. 3 into the open position shown in FIG. 2 or FIG. 4. With a backflow against the throughflow direction Pf1, the valve body 3 is pressed against a valve seat 5, so that a backflow against the throughflow direction Pf1 is effectively prevented via the check valve 1.

In order to dissipate an overpressure which could possibly damage the check valve 1, the housing 2 has a multi-wall design. It has at least two mutually adjacent housing walls 6, 7, which enclose an inner region 8. The housing 2 has a housing outer wall 7 which is made of a flexible and/or elastic material, preferably silicone, and is of tubular form.

The tubular housing outer wall 7 has annular beads 9, 10 on its ends. The annular bead 9 on the inflow side on the housing 2 of the fitting 1 shown in FIGS. 1 and 2 is fastened so that the annular bead 9 seals between the housing 2 and the water pipe in a liquid-tight manner.

It can be seen in FIGS. 1–4 that the annular beads 9, 10 are held similar to a rubber ring respectively in a groove 11, 12 of the adjacent housing wall 6. The downstream end region of the tubular housing outer wall 7 abuts on at least one flange-like housing shoulder 14 of the housing 2.

It can be gathered from FIGS. 1 and 2 that the flexible housing outer wall 7 is movable for pressure equalization with closed check valve 1 and a fluid volume shut off downstream with compression of the inner region 8 against the adjacent housing wall 6. With the preferred embodiment of the fitting 1 shown in FIGS. 3 and 4, it is provided, on the other hand, that a downstream shut-off fluid volume can flow in through a passage opening 20 or a passage channel into the inner region 8 such that the inner region 8 expands and the elastic housing outer wall 7 moves to form a space from the adjacent housing wall 6. With the check valve 1 shown in FIGS. 3 and 4, the housing wall 7 formed as a silicone sheath abuts closely on the housing inner wall 6 of the housing 2 and keeps this always upright in normal operation in the preferred position shown in FIGS. 3 and 4. Only with a high back-pressure is the elastic housing wall 7 expanded in such a manner until it abuts on the adjacent wall (not shown) of the water pipe and thus releases a buffer volume. In both the described embodiments, the whole volume of the inner region 8 is available as a pressure equalizing volume, in order to be able to effectively reduce a possibly damaging overpressure.

After the insertion of the housing 2 shown in FIG. 1 into a sanitary water pipe, the inner region 8 is regularly again filled with air. The inner region 8 filled with air of the fitting 1 shown in FIGS. 1 and 2 in particular acts as a noise and sound insulation, which effectively counters the transmission to the water pipe of the annoying noises arising upon throughflow through the check valve 1 or in other ways.

The check valve 1 shown in FIGS. 1–4 is distinguished by its versatile and functionally reliable operation. The exemplary embodiment shown in FIG. 2 of the check valve 1 has an equalizing channel 16 which connects the inner region 8 with the inflow side of the fitting. With a closed check valve 1 and overpressure acting on the housing outer wall 7, the inner region 8 can thus be rapidly diminished.

If in the fitting 1 shown in FIGS. 1 and 2 the noise and sound insulating action of a inner region 8, in particular filled with air, is to be ensured even after repeated pressure equalization of the check valve 1, it can be appropriate if the inner region 8—as shown in FIG. 1—is closed liquid-tight and airtight to the greatest possible extent. In contrast to the embodiment example shown in FIG. 2, the check valve shown in FIG. 1 therefore has no equalizing channel 16.

So that with a closed check valve 1 and a fluid volume shut off on the downstream side a possibly arising overpressure can be quickly dissipated, the embodiment examples of the check valve 1 shown in FIGS. 1 and 2 have at least one pressure equalizing or inflow channel 15 connected to the downstream side of the fitting, and opening between the housing outer wall and the water pipe. This pressure equalizing and inflow channel 15 is formed here by slots which are arranged between the adjacent housing shoulders 14 of the housing 2.

The invention claimed is:

1. Sanitary fitting (1) constructed as a check valve comprising a housing (2), including multiple walls, which (2) can be inserted in a sanitary water pipe having at least two mutually adjacent housing walls (6, 7) which enclose an inner region (8) therebetween, one of the housing walls (7) of the housing (2) is formed of a flexible and/or elastic material and is tubular in form, the elastic housing wall (7)

can be brought or moved to a spacing from the adjacent housing wall (6), for pressure equalization with the check valve (1) in a closed state and a fluid volume shut off downstream with compression of the at least one inner region (8) against the adjacent housing wall (6) or with expansion of the at least one inner region (8), whereby an outer one of the housing walls (7) is formed of the flexible and/or elastic material, and the elastic housing wall (7) is movable by a fluid volume acting on the elastic housing wall (7) from outside and compressing the inner region, or by a fluid volume flowing into the inner region through at least one passage channel or at least one passage opening (20), with expansion of the inner region (8).

2. Fitting according to claim 1, wherein the at least one inner region (8) can be filled with air or a like sound-insulating medium.

3. Fitting according to claim 1, wherein the elastic housing wall (7) has an annular or sealing bead (9, 10), at least on an end at an inflow side thereof.

4. Fitting according to claim 1, wherein at least one annular bead (9) of the housing outer wall forms a liquid-tight seal between the housing (2) and the water pipe.

5. Fitting according to claim 1, wherein at least one annular bead (9, 10) of the housing outer wall (7) is held like a rubber ring in a groove (11, 12) of the adjacent housing wall (6).

6. Fitting according to claim 1, wherein a downstream end region of the tubular housing outer wall (7) abuts on at least one housing shoulder (14) of the housing.

7. Fitting according to claim 1, wherein the at least one inner region (8) is connected via at least one equalizing channel (16) to an inflow side of the fitting (1).

8. Fitting according to claim 1, wherein the fitting (1) has at least one pressure equalizing or inflow channel (15) connected to an outflow side of the fitting (1) and opening between the housing outer wall (7) and the water pipe.

9. Fitting according to claim 1, wherein the tubular housing outer wall (7) is made from an elastomer.

10. Fitting according to claim 9, wherein the elastomer is a silicone.

* * * * *